(12) United States Patent
Yang et al.

(10) Patent No.: US 8,507,616 B2
(45) Date of Patent: Aug. 13, 2013

(54) HALO-FREE HEAT TRANSFER LABEL WITH PIGMENTED ADHESIVE

(75) Inventors: Weide Victor Yang, Longmeadow, MA (US); Alan C. Grotefend, Elgin, IL (US); Michael B. Colella, Southington, CT (US)

(73) Assignee: Illinois Tool Works Inc., Glenview, IL (US)

( * ) Notice: Subject to any disclaimer, the term of this patent is extended or adjusted under 35 U.S.C. 154(b) by 280 days.

(21) Appl. No.: 13/095,507

(22) Filed: Apr. 27, 2011

(65) Prior Publication Data

US 2012/0100316 A1  Apr. 26, 2012

Related U.S. Application Data

(60) Provisional application No. 61/359,702, filed on Jun. 29, 2010.

(51) Int. Cl.
| *C08G 18/08* | (2006.01) |
| *C08G 18/80* | (2006.01) |
| *C09J 175/04* | (2006.01) |
| *B44C 1/17* | (2006.01) |

(52) U.S. Cl.
USPC ............................. 525/458; 525/457; 524/589

(58) Field of Classification Search
USPC ................................... 525/458, 457; 524/589
See application file for complete search history.

(56) References Cited

U.S. PATENT DOCUMENTS

| 5,919,834 | A | 7/1999 | Downs et al. |
| 5,972,481 | A | 10/1999 | Stein et al. |
| 6,030,438 | A | 2/2000 | Erdtmann et al. |
| 6,510,788 | B1 | 1/2003 | Norheim |
| 6,846,532 | B1 | 1/2005 | Bensur |
| 2002/0062761 | A1 | 5/2002 | Odaka |
| 2006/0204690 | A1 | 9/2006 | Gibson et al. |

FOREIGN PATENT DOCUMENTS

| EP | 0570607 A | | 11/1993 |
| GB | 1586511 A | * | 3/1981 |
| WO | 9705200 A | | 2/1997 |
| WO | 0000352 A1 | | 1/2000 |
| WO | WO 0000352 A1 | * | 1/2000 |
| WO | 2004076569 A | | 9/2004 |
| WO | 2009136130 A1 | | 11/2009 |
| WO | WO 2009136130 A1 | * | 11/2009 |

* cited by examiner

*Primary Examiner* — Kelechi Egwim
(74) *Attorney, Agent, or Firm* — Levenfeld Pearlstein, LLC

(57) ABSTRACT

A pigmented adhesive, halo-free heat transfer label is created when adhesive properties are incorporated into colored inks used to print graphics on labels for items such as apparel. The resulting label has a halo-free graphic applied thereto that eliminates the need for a separate application of adhesive to the label. A pigmented adhesive composition for use with heat transfer type labels includes a hydroxyl-functional polyurethane dispersion, one or more polyurethane dispersions different from the hydroxyl-functional polyurethane dispersion, a blocked cross-linking agent, a catalyst for the blocked cross-linking agent, a pigment dispersion, and an adhesive powder, which are combined prior to the formation of a graphic created using the combined mixture, on the release layer of a substrate.

18 Claims, No Drawings

HALO-FREE HEAT TRANSFER LABEL WITH PIGMENTED ADHESIVE

CROSS-REFERENCE TO RELATED APPLICATION DATA

This application claims the benefit of priority of U.S. Provisional patent application Ser. No. 61/359,702, filed Jun. 29, 2010.

BACKGROUND OF THE INVENTION

The present invention is directed to a pigmented adhesive. More particularly, the present invention pertains to a pigmented adhesive for use with articles subjected to heat, such as hot stamp transfer labels.

Printed labels are well-known and commonly used to transfer a graphic, such as text or a figure, onto an item, such as apparel or merchandise. A label is usually pre-printed with a graphic, and then the graphic is transferred from the label to the item using a heated pad or iron or the like.

Printing techniques such as gravure printing, offset printing, flexographic printing, screen printing and digital printing all can be used to create a heat transfer label. Common to each of these processes is that the graphic is formed on a web or "label substrate" in which, generally, the label substrate is a substrate, such as paper or polymeric material, onto which a release layer is applied. The ink graphic is applied to the release layer, followed by an adhesive. Thus, the adhesive is applied to the top surface of the graphic. When a user then applies the graphic to the item, the label is turned adhesive-side down onto the item and heat is applied to the back of the label substrate to transfer the graphic to the item from the release layer of the label substrate.

Generally known ink formulations consist of resin or polyurethane dispersions, pigment dispersions, surfactant(s), and an amine, with a cross-linker added to the mix prior to coating. The adhesive, on the other hand, is generally formed from resin or polyurethane dispersion, surfactant(s), amine(s), and adhesive powder.

While the composition of ink and adhesive described above and the method of applying the graphic to items is effective, it is not efficient. Each layer of the graphic must be mixed and applied separately; the ink and the adhesive cannot be mixed together and applied in one stroke as the ink and the adhesive need to maintain different chemical characteristics.

For example, labels on garment must be stretchable, water wash resistant, and chemical dry-cleaning resistant. For these reasons, the ink used in the graphic must be cross-linked to form a 3-dimensional network, i.e. becoming a thermoset plastic.

In contrast, the adhesive cannot be cross-linked. The adhesive must be capable of being thermally activated and heat sealable in order for the user to transfer the graphic from the label to the garment. As the label is applied (i.e. hot stamped) the adhesive coated on the last layer of the label becomes "transferable", meaning the adhesive softens and becomes tacky, capable of being adhered to the surface of an item. The ink layer adheres to the adhesive such that the ink graphic and the transferable adhesive together can be applied to an item. The adhesive cannot be cross-linked; as such, the ink and adhesive cannot be combined in one mixing pot as the mixture may result in the adhesive losing its thermoplastic characteristics.

Another drawback of printing a separate adhesive layer is the resulting border of adhesive which extends beyond the colored graphic. All printing processes have a "color to color tolerance" and the adhesive layer must be sized larger than the graphic to incorporate this color to color tolerance. This tolerance, which is determined by the amount of press movement, is inherent in the printing equipment. The adhesive layer is sized larger than the graphic to ensure that even when there is press movement there is a high level of confidence that the adhesive will be behind the entire graphic. For example, if the color to color tolerance of the press is ±0.005 inches, under optimum conditions there will be an even border of adhesive extending 0.005 inches around the entire graphic. Under some conditions, for example, there will be a border of adhesive extending 0.010 inches beyond the graphic in one direction and no border in the other direction. Even under these scenario conditions, however, there is still adhesive behind the entire graphic and the label can be successfully applied to the garment. The net result is that there is an adhesive border on the label which is visible on the garment as a halo around the graphic. This halo is clearly undesirable.

One technique to eliminate the halo effect is to use an adhesive powder. A solid powder consisting of a thermoplastic polymer which has thermal adhesive properties to various fabrics is spread over the wet ink of the graphic during the last step in the printing process. The inks are cured and the adhesive powder will only adhere to the ink with the extraneous powder being removed by either a vacuum process or some other mechanical means. The resulting label has the thermoplastic adhesive resin behind the printed graphic and there is no adhesive border or halo. Due to the size of the powder particles, however, there are some limitations to how fine a line weight can be practically covered with a powder adhesive.

Of course, whether the adhesive is a printed layer or a powder layer applied at the end of the printing process, there is a cost associated with the application of any adhesive to the label.

Accordingly, there is a need for a composition of ink and adhesive that minimizes the steps needed in creating a heat transfer-type label, prevents the premature cross-linking of the adhesive prior to application of the graphic, and prevents "haloing" of the adhesive. Desirably, such a composition allows for long-term storage of pre-made labels and such long term storage does not minimize or diminish adhesivity. More desirably, such a composition is easy to make, use, and apply.

BRIEF SUMMARY OF THE INVENTION

A halo-free heat transfer label, of the type wherein a graphic is formed on a substrate having a release layer thereon, and the graphic is transferred from the substrate onto an associated item using heat, is created when adhesive properties are incorporated directly into the colored inks used to print the graphics. The resulting label has a halo-free graphic that eliminates the need for a separate application of adhesive to the label.

A pigmented adhesive composition for use with such a heat transfer label includes a hydroxyl functional polyurethane dispersion, one or more other polyurethane dispersion different from the hydroxyl-functional polyurethane dispersion, one or more blocked cross-linking agents, a catalyst for the blocked cross-linking agents(s), a pigment dispersion, and a thermoplastic adhesive powder.

In particular, the hydroxyl functional polyurethane dispersion is present in an amount about 9-30% by weight of the total composition and more preferably in an amount about 12-24% by weight of the total composition. The one or more other polyurethane dispersion is present in an amount about 15-45% by weight of the total composition and more preferably in an amount about 20-40% by weight of the total composition. The one or more blocked cross-linking agents is present in an amount about 2-10% by weight of the total composition and more preferably in an amount about 3-6% by weight of the total composition.

The catalyst for the blocked cross-linking agents(s) is present in an amount about 0.2-3% by weight of the total composition and more preferably in an amount about 0.5-2% by weight of the total composition. The pigment dispersion is present in an amount about 8-40% by weight of the total composition and more preferably in an amount about 10-30% by weight of the total composition; similarly, the thermoplastic adhesive powder is present in an amount about 8-40% by weight of the total composition and more preferably in an amount about 10-30% by weight of the total composition.

The one or more other polyurethane dispersions is one or more of a non-functional polyurethane dispersion, a urethane-epoxy resin, an acrylated urethane resin, and a urethane-acrylic hybrid resin. In another embodiment, the one or more other polyurethane dispersion is one or more of a non-functional polyester-based polyurethane and a urethane-acrylic hybrid resin. In still another embodiment, the one or more other polyurethane dispersion is one or more of an oxidative drying polyurethane dispersion and a UV curing polyurethane dispersion. In addition, the one or more other polyurethane dispersion can be a resin with hydroxyl functionality or polyols.

The blocked cross-linking agent is an isocyanate while the catalyst for the blocked cross-linking agent is one or more of an organo-metallic catalyst, wherein the metal is one or more of cobalt, tin, zirconium, manganese, bismuth, and zinc.

The pigmented dispersion is a highly concentrated colorant featuring low VOC, no viscosity drop, and is thixotropic to prevent settling. The adhesive powder is characterized as a thermoplastic hot melt powder or granulated material. The surfactant includes a wetting agent, a deformer, and a rheology modifier. The cross-linking agent is one or more of a polyisocyanate, an aziridine, and a carbodiimide.

The present composition of ink and adhesive minimizes the steps needed to create a heat transfer-type label, prevents the premature cross-linking of the adhesive prior to application of the graphic and prevents "haloing" of the adhesive. The composition allows for long-term storage of pre-made labels without diminishing or minimizing adhesivity. The composition is easy to make, use, and apply.

These and other features and advantages of the present invention will be apparent from the following detailed description, in conjunction with the appended claims.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A pigmented adhesive composition for use with heat transfer type labels includes a hydroxyl-functional polyurethane dispersion (resin or polyol), one or more other polyurethane dispersions (resins) different from the hydroxyl-functional polyurethane dispersion, a catalyst, a blocked cross-linker, a pigment dispersion, an adhesive powder, a surfactant including a wetting agent, a defoamer, and a rheology modifier, an amine, and a cross-linker which is added to the mix prior to coating on the label. While the following examples refer to water-based dispersions and inks, those skilled in the art will appreciate that the invention disclosed and described also can be applied to solvent-based inks, as well as UV curable inks. The pigmented adhesive composition is capable of being transferred to a substrate at both low and high temperature, such temperature range of about 175° F. (low)-400° F. (high).

The method of combining the pigmented adhesive discussed above includes a blocked isocyanate in the mix to prevent undesired cross-linking. The blocked isocyanate can be unblocked when desired by the catalyst when heat is applied. Each component of the present invention will be discussed in detail below.

Polyurethane dispersions with hydroxyl functionality or polyols must also be included. The hydroxyl functional polyurethane dispersion is present in an amount about 9-30% by weight of the total composition and more preferably in an amount about 12-24% by weight of the total composition. Examples include Bayer Bayhydrol PT 241, Bayhydrol PT 355, Bayhydrol PT 475, Bayhydrol XP 2618, Bayhydrol XP 7110, Bayhydrol VP LS 2239. Preferred hydroxyl functional polyurethane dispersions also include Bayer Bayhydrol XP 2591 and Bayhydrol XP 2546.

Other polyurethane dispersion(s) different from the hydroxyl-functional polyurethane dispersions discussed above are present in an amount about 15-45% by weight of the total composition and more preferably in an amount about 20-40% by weight of the total composition. Polyurethane polymers (PUR), such as two component, water-based resins with low cross-link density are of particular interest. An aqueous polyurethane dispersion is a binary colloidal system in which particles of polyurethane are dispersed in a continuous phase such as water. A system of less than 500 milli-micron is stable for storage and has a high surface energy, which results in a strong driving force for film formation. Most conventional polyurethanes are not compatible with water; thus, the present polyurethane has ionic groups incorporated into the backbone of the polymer to form ionomers to facilitate hydrophilic interaction and to increase function as internal emulsifying agents. Tertiary amine functionality may also be incorporated into the polyurethane polymer.

Suitable polyurethane dispersions (also referred to as resins herein) for this invention include urethane-epoxy resins, acrylated urethane resins, and urethane-acrylic hybrid resins. Polyurethane dispersions include Macekote 8539, Macekote 5218, and Macekote 2641 (Mace Adhesives & Coatings Co., Inc.); Bayhydrol® 110 (Bayer Corp.); DAOTAN® VTW, DAOTAN VTW1210, and DAOTAN VTW 6470 (Solutia. Inc.). Suitable acrylated urethane resins include DAOTAN VTW 6462 (Solutia Inc.); polycarbonate urethane resins such as Bayhydrol 121 (Bayer Corp.). Suitable urethane-acrylic hybrid resins include HYBRIDUR 560, HYBRIDUR 570, and HYBRIDUR 580, (Air Products and Chemicals, Inc.).

Additionally, resins for the present composition can be selected from oxidative drying polyurethane dispersions and UV curing polyurethane dispersions. For example, oxidative drying polyurethane dispersions include Bayhydrol VP LS 2342, Bayhydrol XP 2557, Bayhydrol XP 2593, Bayhydrol XP 2592, Bayhydrol F 245, and Bayhydrol VP LS 2943 (Bayer Corp.). UV curing polyurethane dispersions include Bayhydrol UV 2282, Bayhydrol UV LS 2280, Bayhydrol UV VP LS 2317, Bayhydrol UV VP LS 2348, Bayhydrol UV XP 2453, Bayhydrol UV XP 2522, etc. (Bayer Corp.).

The preferred polyurethane dispersions are selected from polyester-based polyurethanes and urethane-acrylic hybrid resins. Such preferred resins include Bayer Impranil® polyurethane dispersions for textile coating, (e.g. Impranil DLN, Impranil DLN-SD, Impranil DLN-W50, Impranil DLS, Impranil DLF, Impranil DLH, Impranil DLN, Impranil DLP, Impranil DLP-R, Impranil DLU, Impranil XP2611, and Impranil LS2384).

Other polyester-based polyurethanes and/or urethane-acrylic hybrid resins include DSM NeoRez® aliphatic polyester water-borne urethanes (e.g., NeoRez® R-1400, NeoRez R-967, NeoRez R-650, and NeoRez R-9621) and Bayer Dispercoll® polyurethane dispersions (such as Dispercoll U42, Dispercoll U53, Dispercoll U54, Dispercoll U56, Dispercoll U KA 8755, Dispercoll U KA 8758, Dispercoll U VP LS 2382, Dispercoll U XP 2578, Dispercoll U XP 2643, Dispercoll U XP 2670, Dispercoll U XP 2673).

Optionally, mixtures of the above resins can contain up to 50 percent by weight of high concentration low molecular weight acrylic resins such as BASF JONCRYL® 58 and/or DSM NeoCryl® A1125.

With regard to the cross-linking of elements of the present composition, the polyurethane dispersions in the ink mixture must be cross-linked to form a 3-dimensional network in order to obtain the desired degree of durability for the heat transfer label. In order to be thermally activated and heat transferable, however, the resins which have adhesive properties cannot be crosslinked until the transfer of the graphic from the substrate to the garment. Polyisocyanates, aziridines, and carbodiimides are cross-linking agents for urethane resins. The cross-linking agent(s) are added to the ink just prior to printing.

Cross-linking agents for the resins with adhesive properties are blocked however, in order to prevent cross-linking at the mixing stage, at the printing stage, or during storage before transfer to the garment. Blocked isocynates, such as Bayer PU-dispersion RSC825 aqueous dispersion of blocked isocyanate, and Baxenden Chemicals Trixene BI series blocked isocyanates serve this purpose. Blocking agent, 3, 5 diethyl pyrazole (DMP molecule), gives a wide range of blocked isocyanates which can thermally unblock as low as 80° C. (with aromatic isocyanates); giving a balance of low temperature unblocking and excellent physical properties. The one or more blocked cross-linking agents is present in the pigmented adhesive composition in an amount about 2-10% by weight of the total composition and more preferably in an amount about 3-6% by weight of the total composition.

Catalysts for the blocked cross-linking agents here refer to organo-metallic catalysts, wherein the metal is one or more of cobalt, tin, zirconium, manganese, bismuth, and zinc, and the like. The catalyst for the blocked cross-linking agents(s) is present in an amount about 0.2-3% by weight of the total composition and more preferably in an amount about 0.5-2% by weight of the total composition. An example of such a catalyst is Vertellus Chemicals' catalyst Coscat® 8330 for blocked isocyanate water-based dispersions.

A pigment dispersion is also necessary for the ink-adhesive composition. High-concentrated colorants, featuring ultra-low VOC (<20 g/L), are characterized by their high-strength, resin-free composition, and a blend of dispersants. A preferred pigment dispersion does not contain either a large amount of surfactant or thixotropic agent. The pigment dispersion is present in an amount about 8-40% by weight of the total composition and more preferably in an amount about 10-30% by weight of the total composition. The pigments for the pigment dispersion include Elementis Specialties, Tint-Ayd® CW5668 (light organic red), CW5454 (light organic yellow), CW5317 (tint black), and metallic dispersion—CW5003 (rutile titanium dioxide), etc, and APE-free, tin-free pigment dispersions Tint-Ayd HC series 6451 CW Yel Ox, Light Organic Yellow 6454, High Strength Harsa Yellow 6424, Organic Yellow-Medium 6490, Disazo Medium Yellow 6488, Organic Scarlet 6647, Organic Red 6657, Fast Red 6695, DPP Red 6654, Toluidine Red Medium 6633, Deep Organic Red 6673, Quinacridone Red 6625, Quinacridone Magenta 6631, Quinacridone Violet 6115, Carbazole Violet 6119, Phthalo Blue (Red shade) 6228, Phthalo Blue (Green shade) 6292, Phthalo Green 6703, Bismuth Vanadate Yellow 6437, Light Lemon Yellow Oxide 6451, Organic Oxide YS 6462, Transparent Yellow Oxide 6499, Transparent Red Oxide 6600, Red Oxide Light 6610, Red Oxide Dark 6614, Brown Oxide 6503, Burnt Umber 6509, Red Sienna 6507, Tinting Black 6317, Masstone Black 6331, 6300, Rutile TiO2 6003, etc. These are strongly recommended for polyurethanes, featuring very low VOC level (<20 g/l), no viscosity drop, and are thixotropic (to prevent settling).

With regard to an adhesive, an adhesive powder can be used with the present ink-adhesive composition. Adhesives powders that are contemplated are characterized as thermoplastic hot melt powders and granules for bonding and may be present in an amount of about 8-40% by weight of the total composition, and more preferably in an amount of about 10-30% by weight of the total composition. Examples of such powders are: thermoplastic polyurethane powders such as Dakota Coatings Unex 4073, 4078, 4126, 4529, 4104, 4115, 4610 and Huntsman Irostic® multi-purpose grades S6148, S 6514, S 7514, S 7614, S 8743, and special grade S6515, S 6530, S6558, S7730, S 8612, S 8735, S 9815, S 9827, etc; copolyamide powders such as Dakota Coatings Copolyamide PA T1, PA T2, PA T5, PA T8, PA T11, and PA T15 and EMS Griltex® AA 1796, D1541A/D1566A; and copolyester powders such as Dakota Coatings PES T2, PES T3, PES T4, PES T5, PES T6, PES T7, PES T8, and EMS Griltex®6E, 9E, D 1309E, D 1310E, D 1365E, D 1682E, D 1702E, D 1750E, D 1765E, and D 2089E. The melting range for the latter is 75-180° C., Tg-13-28° C., the melt viscosity 80-1200 Pa*s, MVR 9-350, and the crystallization speed can vary.

It will be appreciated by those of skill in the art that the present pigmented adhesive may be formulated in a variety of different ways. For example, two illustrative compositions, Composition #1 and Composition #2 are shown in TABLE 1 and TABLE 2 respectively, and described below.

TABLE 1

COMPOSITION #1

| | % wt/total |
|---|---|
| Polyurethane dispersion (DSM NeoRez R-967) | 14.00% |
| Hydroxyl functional polyurethane dispersion (Bayhydrol XP 2591) | 17.4 |
| Polyurethane dispersion (Bayer Dispercoll U42) | 17.4 |
| Substrate wetting additive (Evonik Tego Wet 270) | 0.5 |
| Defoamer for aqueous solutions (Munzing Agitan E255) | 0.2 |
| DMEA | 0.1 |
| Catalyst for blocked cross-linking agents (Vertellus Coscat 8330) | 1.0 |
| n-Propanol | 0.8 |
| water | 0.8 |
| Anti-foaming agent/defoamer (Evonik Tego Foamex 822) | 0.1 |
| Evaporating solvent and anti-coagulant (Dowanol DPM) | 1 |
| Blocked Cross-linking agent (Baxenden Trixene BI 7987) | 4.19 |
| Pigment Dispersion (Elementis Tint Ayd CW5003) | 29.4 |
| Adhesive Powder (EMS Griltex 9E) | 12.1 |
| Acrylic Polymer (Rohm and Haas Acrysol TT-678) | 1.0 |

In the illustrative example of TABLE 1, Composition #1 combined 13.93 grams (or percent by weight) of a polyurethane dispersion, such as DSM NeoRez® R-967 with 17.3 grams of a hydroxyl functional polyurethane dispersion (Bayer Dispercoll® U42 and Bayer Bayhydrol® XP 2591), and another polyurethane dispersion such as Bayer Dispercoll U42 in an amount of 17.3 grams together in a 250 c.c. glass beaker. Added to the mixture was 0.5 grams of a substrate wetting additive (Evonik Tego® Wet 270), 0.2 grams of a defoamer for aqueous solutions (Munzing Agitan® E255), and 0.1 grams of DMEA.

In composition #1, one (1) gram of a catalyst for the blocked cross-linking agents (Vertellus Coscat® 8330) was pre-mixed in 0.8 grams of n-propanol and 0.8 grams of water. The pre-mix was added to the above mixture along with 0.1 grams of another anti-foaming agent/defoamer (Evonik Tego® Foamex 822) and one (1) gram of an evaporating solvent (Dow Dowanol™ DPM).

About 4.17 grams of a blocked cross-linking agent (Baxenden Trixene BI 7987) was added to the vessel. After 30 minutes of continuous mixing, 29.3 grams of pigment dispersion (Elementis Tint-Ayd® CW5003) was slowly added and the mixture was mixed for 40 minutes. Twelve (12) grams of adhesive powder (EMS Griltex® 9E adhesive powder) was also added and mixed in. One (1) gram of acrylic polymer (Rohm and Haas Acrysol™ TT-678) was mixed in to form the final pigmented adhesive.

Prior to printing the pigmented adhesive onto a label substrate, a cross-linker, such as DSM NeoRez® CX-100, in the amount of about ten percent (10%) by weight of the composition, was added and mixed in thoroughly. The pigmented adhesive was then printed onto a label substrate as a coated film. The coated film was placed in a 170° F. oven for three (3) minutes to dry the mixture. The coating and drying steps were repeated, then incubated at 50° C. for sixteen (16) hours. The label was transferred onto a suitable fabric substrate using a hot stamp machine or other suitable heat transfer equipment. The label was hot stamped at 384° F. for fifteen (15) seconds under 81 psi. This label was water washed at 60° C. and dried five (5) times. The pigmented adhesive composition withstood the water and heat testing without loss of adhesion, stretchability, or discoloration. In addition, no halo-effect was visible on the fabric substrate or the label substrate.

TABLE 2

| COMPOSITION #2 | |
| --- | --- |
| | % by weight |
| Polyurethane dispersion (DSM NeoRez R-967) | 12.8 |
| Hydroxyl functional polyurethane dispersion (Bayhydrol XP 2591) | 12.8 |
| Polyurethane dispersion (Bayer Dispercoll U42) | 25.7 |
| Substrate wetting additive (Evonik Tego Wet 505) | .5 |
| Defoamer for aqueous solutions (BYK-019) | .2 |
| Catalyst for blocked cross-linking agents (Vertellus Coscat 8330) | 1.36 |
| n-Propanol | 0.8 |
| Water | 0.8 |
| Anti-foaming agent/defoamer (Evonik Tego Foamex 822) | 0.1 |
| Evaporating solvent and anti-coagulant (Dowanol DPM) | 1.0 |
| Blocked Cross-linking agent (Baxenden Trixene BI 7987) | 5.1 |
| Pigment Dispersion (Elementis Tint Ayd CW5003) | 13.0 |
| Adhesive Powder (EMS Griltex 1750E P1) | 24.6 |
| Acrylic Polymer (Rohm and Haas Acrysol TT-678) | 1.0 |

Another illustrative example is shown above in TABLE 2 in which composition #2 was formed by mixing 0.5 grams of a substrate wetting additive (Evonik Tego®Wet 505) to 0.2 grams of a defoamer (BYK-019), 12.5 grams of a polyurethane dispersion (DSM NeoRez® R-967), 12.5 grams of a hydroxyl functional polyurethane dispersion (Bayer Bayhydrol® XP 2591), and 25 grams of a second polyurethane dispersion (Bayer Dispercoll®U42) in a 250 cc glass beaker under agitation.

A premix of 1.33 grams of a catalyst for blocked crosslinking agents (Vertellus Coscat® 8330), 0.8 grams of n-Propanol and 0.8 grams of water were added. In addition, 0.1 grams of a defoamer/anti-foaming agent (Evonik Tego® Foamex 822), and 1.0 grams of an evaporating solvent and anti-coagulant (Dow Dowanol™ DPM) were added. Under agitation, 5.0 grams of a blocked cross-linking agent (Baxenden Trixene BI 7987) were added.

After 30 minutes of mixing, 12.67 grams of a pigment dispersion (Elementis Tint-Ayd® CW5228 phthalo blue red shade) was added and the mixture was mixed for another 40 minutes. Slowly mixed in was 24.0 grams of adhesive powder (EMS Griltex® 1750E P1) and the mixing continued for 30 minutes. Mixing speed was increased and 1.0 gram of an acrylic polymer (Rohm and Haas Acrysol™ TT678) was added and mixed in for 5 minutes to form the pigmented adhesive composition.

Prior to printing, 5% by weight of a cross-linking agent (DSM NeoRez® CX-100) was added and mixed thoroughly. The pigmented adhesive was then printed onto the release layer of a label substrate as a coated film. The coated film was placed in a 170° F. oven for three (3) minutes to dry the mixture. The coating and drying steps were repeated, then incubated at 50° C. for sixteen (16) hours. The label was transferred onto a suitable fabric substrate using a hot stamp machine or other suitable heat transfer equipment. The label was hot stamped at 384° F. for fifteen (15) seconds under 81 psi. This label was water washed at 60° C. and dried five (5) times. Again, the pigmented adhesive composition withstood the water and heat testing without loss of adhesion, stretchability, or discoloration. In addition, no halo-effect was visible on the fabric substrate or the label substrate.

The advantage to the present pigmented adhesive composition will be appreciated by those skilled in the art. The present pigmented adhesive composition minimizes the steps needed in creating a heat transfer-type label, prevents the premature cross-linking of the adhesive prior to application of the graphic, and prevents "haloing" of the adhesive. Labels formed with the present compositions above are capable of being transferred at both high and low temperatures. For example, a label from the above compositions can be transferred to a substrate at between about 200° F. (low)-400° F. (high). Furthermore, the present pigmented adhesive composition also allows for long-term storage of pre-made labels and does not minimize or diminish adhesivity. Furthermore, the present pigmented adhesive composition is easy to make, use, and apply.

All patents referred to herein, are incorporated herein by reference, whether or not specifically done so within the text of this disclosure. In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A pigmented adhesive composition for use with a heat transfer label of the type wherein a graphic is formed on a substrate having a release layer thereon and the graphic is transferred from the release layer of the substrate onto an associated item using heat, the pigmented adhesive composition comprising:
   a hydroxyl-functional polyurethane dispersion;
   one or more other polyurethane dispersion different from the hydroxyl-functional polyurethane dispersion;
   a blocked cross-linking agent;
   a catalyst for the blocked cross-linking agent;
   a pigment dispersion; and
   an adhesive powder,
   wherein the hydroxyl-functional polyurethane dispersion, the one or more other polyurethane dispersion, the blocked cross-linking agent, the catalyst for the blocked cross-linking agent, the pigment dispersion, and the adhesive powder are combined in a mixture prior to applying the pigmented adhesive on the release layer of the substrate.

2. The pigmented adhesive composition of claim 1 wherein the one or more other polyurethane dispersion is one or more of a non-functional polyurethane dispersion, a urethane-epoxy resin, an acrylated urethane resin, a urethane-acrylic hybrid resin, an oxidative drying polyurethane dispersion, and an ultra-violet curing polyurethane dispersion.

3. The pigmented adhesive composition of claim 1 wherein the one or more other polyurethane dispersion is present in an amount of about 6-26% by weight of a total weight of the composition.

4. The pigmented adhesive composition of claim 1 wherein the blocked cross-linking agent is an isocyanate.

5. The pigmented adhesive composition of claim 1 wherein the blocked cross-linking agent is present in an amount of about 5.0% by weight of the composition.

6. The pigmented adhesive composition of claim 1 wherein the catalyst for the blocked crossing agent is an organo-metallic catalyst, wherein the metal is one or more of cobalt, tin, zirconium, manganese, bismuth, and zinc.

7. The pigmented adhesive composition of claim 1 wherein the catalyst for the blocked cross-linking agent is present in an amount about 0.2-3% by weight of the composition.

8. The pigmented adhesive composition of claim 1 wherein the pigmented dispersion is a high-concentrated colorant featuring low VOC, exhibits no viscosity drop and is thixotropic.

9. The pigmented adhesive composition of claim 1 wherein the pigmented dispersion is present in an amount of about 8-40% by weight of the composition.

10. The pigmented adhesive composition of claim 1 wherein the adhesive powder is a thermoplastic hot melt powder or granulated material.

11. The pigmented adhesive composition of claim 1 wherein the adhesive powder is present in an amount of about 8-40% by weight of the composition.

12. A halo-free heat transfer label comprising:
   a substrate having a release layer thereon; and
   a pigmented adhesive formulated from a hydroxyl-functional polyurethane dispersion, one or more other polyurethane dispersion different from the hydroxyl-functional polyurethane dispersion, a blocked cross-linking agent, a catalyst for the blocked cross-linking agent, a pigment dispersion, an adhesive powder, a surfactant including a wetting agent, a deformer, and a rheology modifier, and a cross-linking polymer, wherein the hydroxyl-functional polyurethane dispersion, the one or more other polyurethane dispersion, the catalyst, the blocked cross-linker, the pigment dispersion, the adhesive powder, the surfactant, the amine, and the cross-linking polymer are combined in a mixture prior to applying the pigmented adhesive on the release layer of the substrate.

13. The halo-free transfer label of claim 12 wherein the one or more other polyurethane dispersion is one or more of a non-functional polyurethane dispersion, a urethane-epoxy resin, an acrylated urethane resin, a urethane-acrylic hybrid resin, a non-functional polyester-based polyurethane, an oxidative drying polyurethane dispersion, and an ultra-violet curing polyurethane dispersion.

14. The halo-free transfer label of claim 12 wherein the one or more other polyurethane dispersion is present in an amount of about 6-26% by weight of a total weight of the composition.

15. The halo-free transfer label of claim 12 wherein the blocked cross-linking agent is an isocyanate and is present in an amount of about 5.0% by weight of the composition.

16. The halo-free transfer label of claim 12 wherein the catalyst for the blocked crossing agent is present in an amount about 0.2-3% by weight of the composition and is an organo-metallic catalysts, wherein the metal is one or more of cobalt, tin, zirconium, manganese, bismuth, and zinc.

17. The halo free transfer label of claim 12 wherein the pigmented dispersion is present in an amount of about 8-40% by weight of the composition.

18. The halo free transfer label of claim 12 wherein the adhesive powder is present in an amount of about 8-40% by weight of the composition and is a thermoplastic hot melt powder or a granulated material.

* * * * *